United States Patent [19]
Faass et al.

[11] Patent Number: 5,795,258
[45] Date of Patent: Aug. 18, 1998

[54] PLANET WASHER

[75] Inventors: Jan J. Faass; Paul M. Cornish, both of Burlington; David R. Moulton, North Canton, all of Conn.

[73] Assignee: The Torrington Company, Torrington, Conn.

[21] Appl. No.: 804,189

[22] Filed: Feb. 21, 1997

[51] Int. Cl.⁶ .................................. F16H 57/04
[52] U.S. Cl. ........................... 475/348; 475/159
[58] Field of Search ...................... 475/159, 348

[56] References Cited

U.S. PATENT DOCUMENTS

| | | |
|---|---|---|
| 2,249,501 | 10/1941 | Teker . |
| 3,178,967 | 4/1965 | Fritsch ........................ 475/348 |
| 3,199,375 | 8/1965 | Rosen et al. . |
| 4,222,290 | 9/1980 | Helmer et al. ................ 475/159 |
| 4,776,237 | 10/1988 | Premiski et al. . |
| 4,983,152 | 1/1991 | Kimberlin et al. . |
| 5,188,576 | 2/1993 | Maguire et al. ............... 475/348 |
| 5,368,528 | 11/1994 | Farrell ......................... 475/159 |

*Primary Examiner*—Dirk Wright
*Attorney, Agent, or Firm*—John C. Bigler

[57] ABSTRACT

A substantially flat, steel ring having an axis, has an axial end face with two parallel chordal grooves disposed symmetrically about a central aperture. A flat end surface between the chordal grooves engages an adjacent planet gear and ends of rollers supporting the planet gear. A portion of the chordal grooves is radially inward of the outer raceway of the rollers, providing a lubricant path between the planet washer and the planet gear.

7 Claims, 2 Drawing Sheets

5,795,258

1

PLANET WASHER

BACKGROUND OF THE INVENTION

This invention relates generally to planetary gear sets and, more particularly, to a planet washer to be used on a planet shaft adjacent to a planet gear to provide improved lubricant flow.

Typically, a planetary gear set uses plain, flat planet washers on planet shafts between frame members and planet gears. The planet washers receive thrust from the planet gears and retain bearings supporting the planet gears on the planet shafts. Commonly, each location uses a flat steel washer mated to a flat, sacrificial bronze washer to provide the necessary strength and friction/wear requirements.

Such conventional planet washers do not allow sufficient lubricant flow through needle bearings used to support the planet gears, even when clearances are provide along the perimeter of the apertures of the planet washers. As a result of heat buildup within the needle bearings, rollers may become blackened and damaged, leading to bearing failure. In addition, failure may result from wear on the planet washers themselves.

The foregoing illustrates limitations known to exist in present devices and methods. Thus, it is apparent that it would be advantageous to provide an alternative directed to overcoming one or mor of the limitations set forth above. Accordingly, a suitable alternative is provided including features more fully disclosed hereinafter.

SUMMARY OF THE INVENTION

In one aspect of the invention, this is accomplished by providing a planet washer comprising a substantially flat, steel ring having an axis, a round perimeter, a central aperture and two axial end faces. At least one of the two axial end faces has two parallel chordal grooves disposed symmetrically about the central aperture. The chordal grooves are spaced apart such that when the planet washer is adjacent to a planet gear supported by rollers on a planet shaft, a flat end surface with a width greater than the pitch diameter of the rollers and a length extending to the round perimeter of the steel ring engages the planet gear and ends of the rollers. The chordal grooves are spaced close enough together such that a portion of the chordal grooves is radially inward of the outer raceway of the rollers, providing a lubricant path.

The foregoing and other aspects will become apparent from the following detailed description of the invention when considered in conjunction with the accompanying drawing figures.

BRIEF DESCRIPTION OF THE DRAWING FIGURES

2

DETAILED DESCRIPTION

Figure 1:
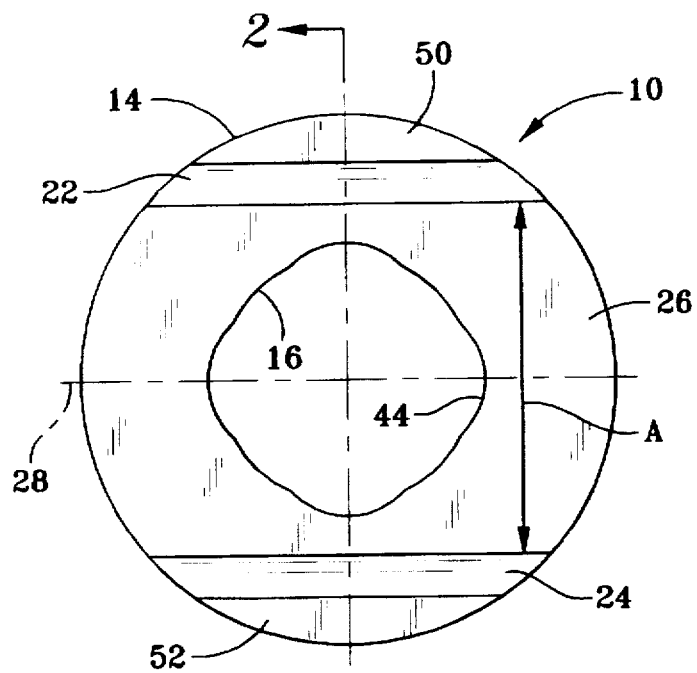
FIG. 1 is an axial end view illustrating a first embodiment of the planet washer of the present invention.
Figure 2:
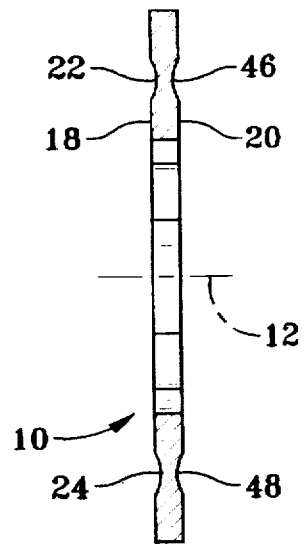
FIG. 2 is a cross sectional view of the planet washer of FIG. 1.
Figure 3:
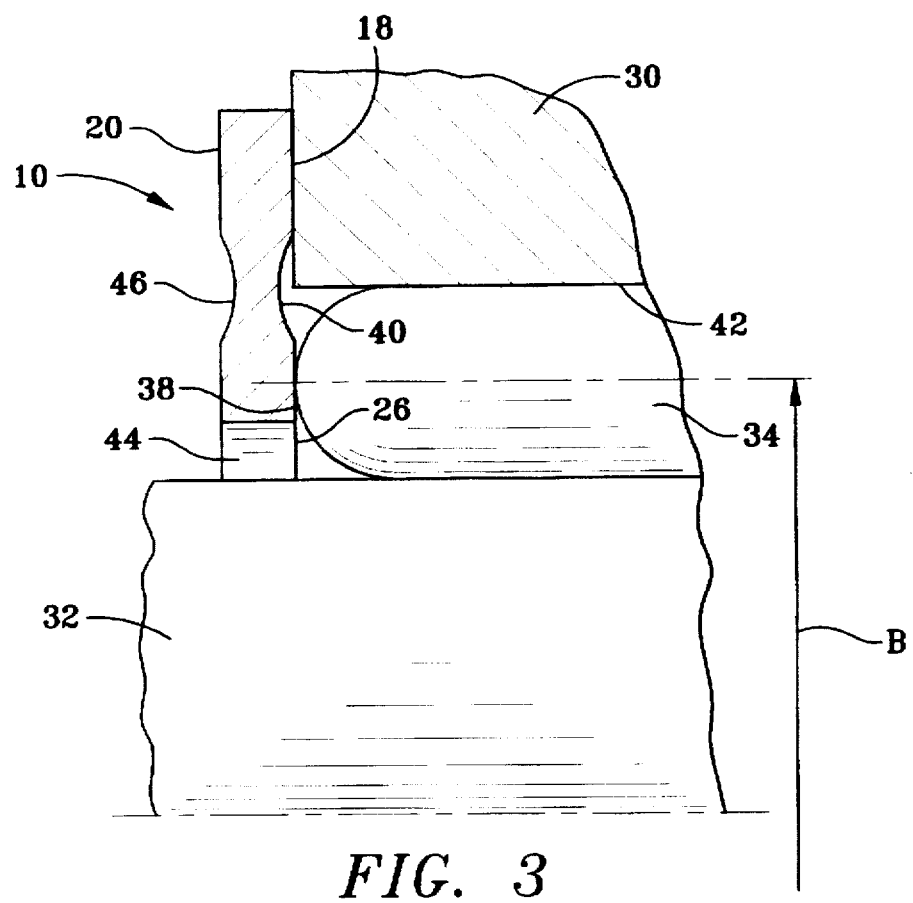
FIG. 3 is a cross sectional view of a portion of the planet washer of FIG. 1 as installed in a planet gear set.

Referring now to the drawings, FIGS. 1 through 3 illustrate planet washer 10, according to a first embodiment of the present invention, comprising a substantially flat, steel ring with axis 12, round perimeter 14, central aperture 16, and two axial end faces 18 and 20.

At least one of end faces 18 and 20 has two parallel chordal grooves 22 and 24 disposed symmetrically about central aperture 16. Flat end surface 26 has width "A" and a length extending the diameter of planet washer 10 along line 28 to round perimeter 12. As illustrated in FIG. 3, planet washer 10 is for use adjacent to planet gear 30 that is supported on planet shaft 32 by rollers 34 that are located along pitch diameter 36. Chordal grooves 22 and 24 are spaced far enough apart so that width "A" is greater than pitch diameter "B" such that roller end portion 38 engages flat surface 26.

Significantly, chordal grooves 22 and 24 are spaced close enough together so that portion 40 of chordal groove 22 is located radially inward of outer raceway 42. Outer raceway 42 may be on planet gear 30 as shown in FIG. 3 or may be provided on a separate bearing ring between rollers 34 and planet gear 30. As a result of this configuration, a path for lubricant is provided along chordal groove 22 between planet gear 30 and planet washer 10. A similar path for lubricant is provided along chordal groove 24.

Although not required for the practice of the present invention, central aperture 16 may have a modified-circular perimeter to provide additional clearance between planet washer 10 and planet shaft 32 to provide paths for lubricant to flow past planet washer 10 to rollers 34, as shown in FIG. 3. In this first embodiment, the additional clearance is provided by rounded cutouts 44 spaced evenly along the perimeter at 90 degree intervals. Alternatively, other variations from a circular perimeter may be used to provide such paths for lubricant along planet shaft 32.

End face 20 of planet washer 10 provides a thrust surface for receiving a planet gear set frame, not shown. Chordal grooves are not required to provide a path for lubricant between planet washer 10 and the planet gear set frame; however, chordal grooves 46 and 48 similar to chordal grooves 22 and 24 may be provided on end face 20 to allow planet washer to be installed with either end face 18 or end face 20 oriented toward planet gear 30. Chordal grooves 46 and 48 may be parallel to and axially overly chordal grooves 22 and 24, as shown, or may be angularly displaced with respect to each other.

Chordal grooves 22 and 24 may have a cross-section comprising an arc of a circle, as shown, or may be otherwise shaped to provide a suitable path for lubricant. The bottom of chordal grooves 22 and 24 may be flat or otherwise recessed with respect to flat end surface 26 and may extend radially outwardly to round perimeter 14, eliminating chordal portions 50 and 52 of the first embodiment.

Figure 4:
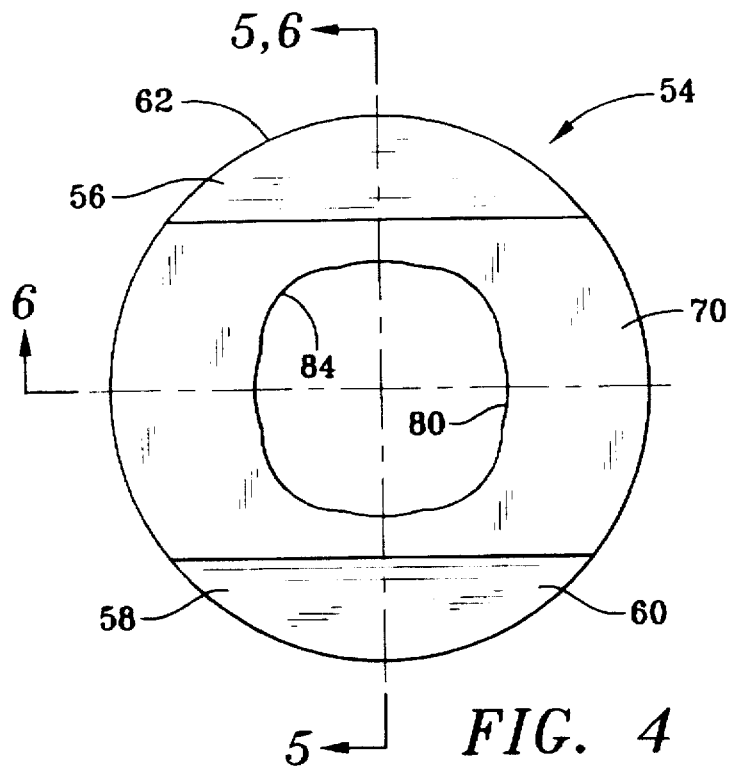
FIG. 4 is an axial end view illustrating a second embodiment of the planet washer of the present invention.
Figure 5:
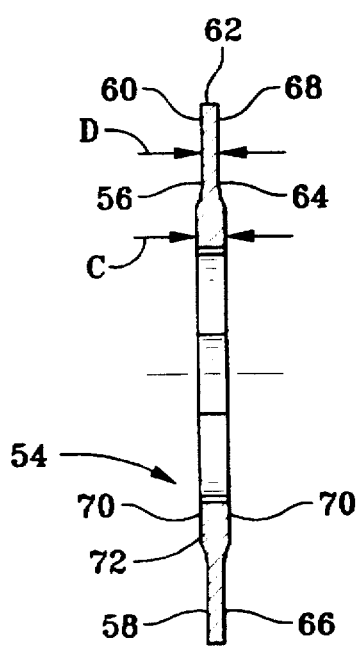
FIG. 5 is a cross sectional view of the planet washer of FIG. 4, as indicated by the line 5—5.
Figure 6:
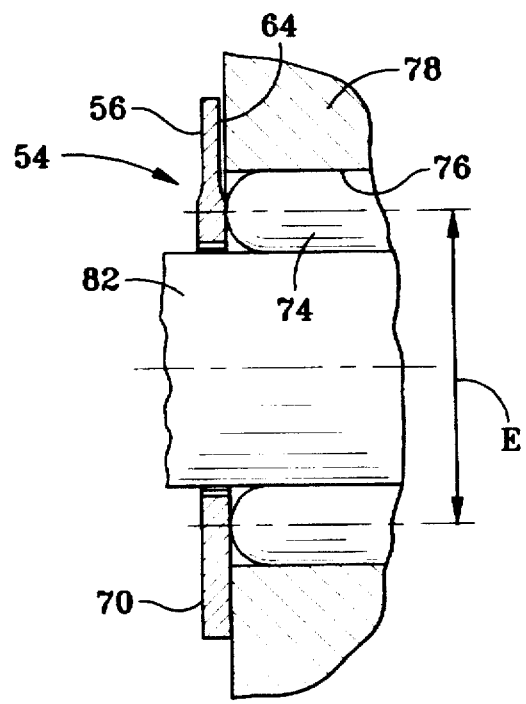
FIG. 6 is a sectional view of the planet washer of FIG. 4, as indicated by the line 6—6, as installed in a planet gear set.

FIGS. 4 through 6 illustrate planet washer 54, a second embodiment of the present invention with chordal grooves 56 and 58 on axial end face 60 and extending radially outwardly to round perimeter 62. Similar chordal grooves 64 and 66 are provided on axial end face 68 to simplify orientation requirements. In this embodiment, chordal grooves 56 and 58 are parallel to and overly chordal grooves 64 and 66 such that planet washer 54 has multiple thicknesses, a maximum thickness "C" at flat end surface 70 and a minimum thickness "D" at recessed flat chordal portions of chordal grooves 56 and 58. Radius 72 may be provided between flat end surface 70 and the recessed flat chordal portions.

As evident from FIG. 6, chordal grooves 56 and 64 are radially outward of pitch diameter "E" of rollers 74 and extend radially inwardly of outer raceway 76. As a result, ends of rollers 74 engage flat end surface 70 on axial end face 68 between the chordal grooves and a path for lubricant is provided between planet washer 54 and planet gear 78. Flat end surface 70 on axial end face 60 provides a thrust surface for engaging a planet gear set frame, not shown.

Central aperture 80 of planet washer 54 has a modified-circular perimeter similar to that of planet washer 10, thereby providing a lubricant path between shaft 82 and planet washer 54. Again, such additional clearance is not required for the practice of the present invention and, as illustrated in FIG. 4, rounded cutouts 84 may have any orientation with respect to the chordal grooves.

The present invention provides enhanced lubricant flow through the planet bearing and across the planet washer. The chordal grooves allow for an exit of lubricant so that heat buildup in the bearings and washer wear/failure do not occur. The chordal grooves are radially outward of the pitch diameter of the rollers, avoiding any interruption of smooth rotation of the rollers. And, the design of the planet washer eliminates the need for a sacrificial bronze washer or bronze wearing surface.

Having described the invention, what is claimed is:

1. A planet washer for use adjacent to a planet gear supported by rollers on a planet shaft, the rollers having a pitch diameter and an outer raceway, the planet washer comprising:

a substantially flat, steel ring having an axis, a round perimeter, a central aperture and two axial end faces;

at least one of the two axial end faces having two parallel chordal grooves disposed symmetrically about the central aperture, the chordal grooves being spaced apart such that a flat end surface having a width greater than the pitch diameter of the rollers and a length extending to the round perimeter of the steel ring is provided between the chordal grooves for engaging the planet gear and ends of the rollers, the chordal grooves being spaced close enough together such that a portion of the chordal grooves is radially inward of the outer raceway of the rollers, providing a lubricant path.

2. The planet washer according to claim 1, wherein the chordal grooves have a cross-section comprising an arc of a circle.

3. The planet washer according to claim 1, wherein the chordal grooves extend radially outwardly to the round perimeter of the steel ring such that chordal portions of said one axial end face are recessed with respect to the flat end surface between the chordal grooves.

4. The planet washer according to claim 3, wherein the steel ring has multiple thicknesses, a first thickness being provided at the flat end surface between the chordal grooves and a second thickness being provided at the recessed chordal portions.

5. The planet washer according to claim 1, wherein the number of the axial end faces having two parallel chordal grooves disposed symmetrically about the central aperture is two, such that the planet washer may have either axial end face oriented toward the planet gear and rollers.

6. The planet washer according to claim 5, wherein the chordal grooves on one of the end faces of the steel ring are parallel to and axially overly the chordal grooves on the other of the end faces of the steel ring.

7. The planet washer according to claim 1, wherein the central aperture has a modified-circular perimeter wherein additional clearance is provided at intervals along the perimeter, between the planet washer and the planet shaft.

* * * * *

UNITED STATES PATENT AND TRADEMARK OFFICE
CERTIFICATE OF CORRECTION

PATENT NO. : 5,795,258
DATED : August 18, 1998
INVENTOR(S) : Ian J. Faass, et al It is certified that error appears in the above-identified patent and that said Letters Patent is hereby corrected as shown below:

On the title page, item [75] Inventors: should read -- Ian J. Faass; Paul M. Cornish both of Burlington; David R. Moulton, North Canton, all of Conn. --

Signed and Sealed this

Fifth Day of January, 1999

*Attest:*

*Attesting Officer*

*Acting Commissioner of Patents and Trademarks*